March 9, 1943.  G. A. UNGAR  2,313,403

GAS SEPARATOR FOR LIQUID DISPENSING APPARATUS

Filed Feb. 2, 1939  8 Sheets-Sheet 1

March 9, 1943. G. A. UNGAR 2,313,403
GAS SEPARATOR FOR LIQUID DISPENSING APPARATUS
Filed Feb. 2, 1939     8 Sheets-Sheet 5

INVENTOR
Gustave A. Unger
BY
ATTORNEY

March 9, 1943.　　　　G. A. UNGAR　　　　2,313,403
GAS SEPARATOR FOR LIQUID DISPENSING APPARATUS
Filed Feb. 2, 1939　　　8 Sheets-Sheet 6

INVENTOR
Gustave A. Ungar
BY
ATTORNEY

Patented Mar. 9, 1943

2,313,403

UNITED STATES PATENT OFFICE 2,313,403

GAS SEPARATOR FOR LIQUID DISPENSING APPARATUS

Gustave A. Ungar, Pelham Manor, N. Y., assignor to Joseph F. Keller, New York, N. Y.

Application February 2, 1939, Serial No. 254,179

16 Claims. (Cl. 183—2.5)

This invention relates to dispensing apparatus such as is used in vending motor fuels to the consumer and has for its object to improve such apparatus. Another object is to provide an improved gas separator for such apparatus which is efficient yet simple in operation and not expensive to produce. A further object is to provide an air separator of the type having a controlled vent yet capable of preventing the passage of liquid past the vent when open. Yet another object is to provide means to insure being able to automatically prime the liquid pump on starting.

In existing apparatus for dispensing gasoline and other volatile liquids, it is known that gas or air mixed with liquid has to be removed to prevent inaccuracies in metering. One form of separator has a vent always open to the atmosphere, but this requires a high enough static head of liquid to counterbalance pump pressure. Another type of air and gas separator has a valve controlled vent with a settling chamber or the like for liquid which has passed said vent and valve, and some means for returning excess liquid in the settling chamber to the suction side of the pump or to the supply tank underground. This entails needless pumping losses. Under this invention there is provided a vent valve capable of closing in response to a liquid surge, with the result that no liquid passes said vent and no settling chamber or means for returning excess liquid therein is necessary.

Another objection to some of the suction systems for drawing liquid from the storage tank is the danger of a foot valve or check located near the tank, leaking with the result liquid surrounding the pump may be siphoned back into the tank, leaving no liquid for priming the pump and making the resumption of liquid flow more difficult. This disadvantage has been substantially eliminated, an automatic siphon breaker being provided to insure a liquid pool at the pump for priming regardless of whether a foot valve may leak or not.

Referring to the drawings.

Figures 1, 2, 3, 4, 5, 6:
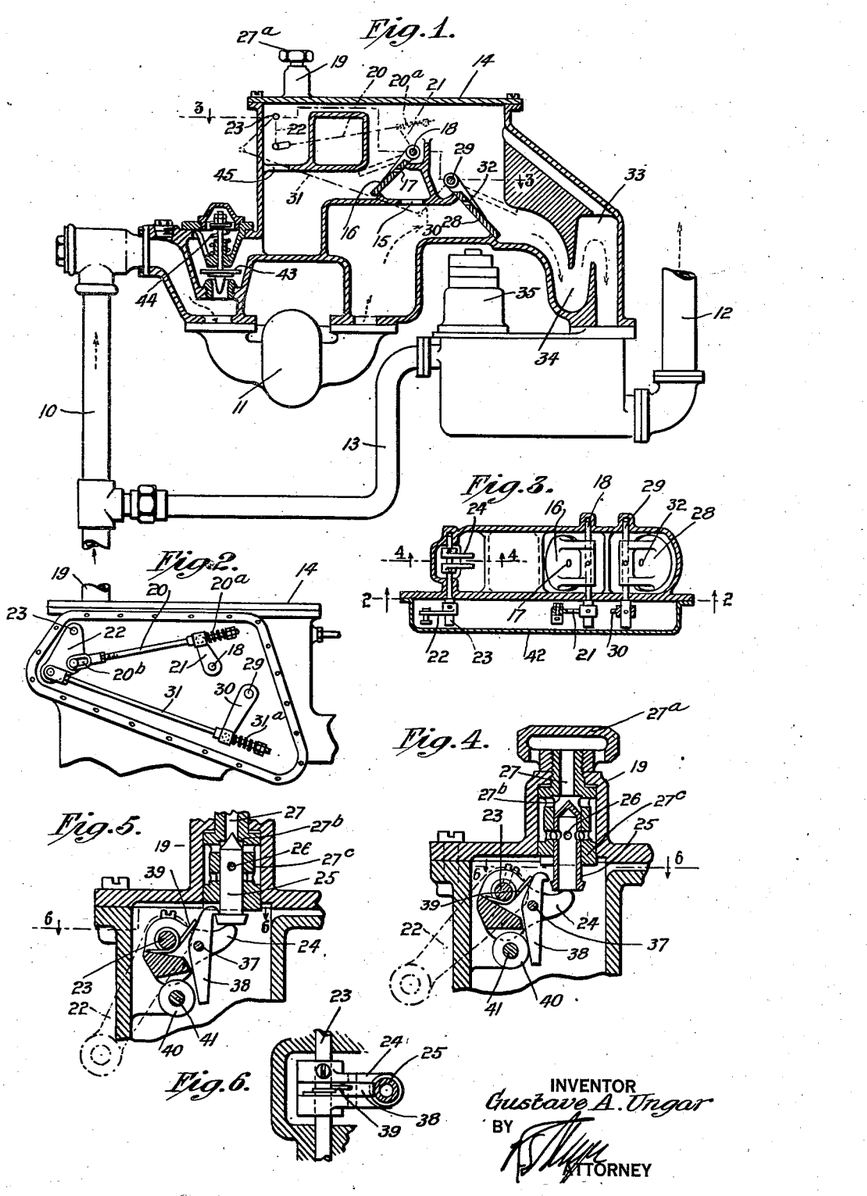
Fig. 1 shows one embodiment of this invention.
Fig. 2 is a section on the line 2—2 with the cover removed, in Fig. 3.
Fig. 3 is a section on the line 3—3 of Fig. 1.
Fig. 4 is a section on the line 4—4 of Fig. 3.
Fig. 5 is a view corresponding to Fig. 4, but showing the valve closed.
Fig. 6 is a section on the line 6—6 of Fig. 5.

As shown in Fig. 1, the pipe, 10, is connected at its lower end to a liquid supply tank such as is used for storing gasoline to be dispensed by a pump. This pipe 10 is connected to a passage leading into the pump 11 from which liquid is passed through the separator and finally out the discharge pipe 12 leading to a meter and nozzle. To take care of liquid being pumped after the nozzle has been closed, a return pipe 13, controlled by a check valve 76 (Fig. 9), leads back and is connected with the pipe 10. This separating chamber is preferably a casting having a removable cover 14 in which is provided a vent passage housing 19. An opening 15 for liquid and gas leads to a small space normally closed by a flap valve 16 pivoted at 18 and provided with a small gas vent 17. Also secured on the shaft 18 is a lever arm 21 (see Fig. 2) connected with the rod 20 for actuating another lever 22, pivoted on the shaft 23. A spring 20a, yieldably transmits movement from the lever 21 to the rod 20. As shown in Figs. 4 and 5, an arm 24 is also secured on the shaft 23 and is bifurcated or shaped as shown in Fig. 6 for engaging the lower part of the vent valve 25 and raising and closing it. Holes 26 in the vent valve 25 co-operate with corresponding openings in the housing to allow escape of gas past the valve and out the top of the vent when the valve is open. When the valve is raised and in the position shown in Fig. 5, the vent passage 27 is closed by contact between the conical portion of the valve engaging its seat 27b.

Over the vent opening 27 is placed an umbrella-like hood 27a to keep dirt and rain from getting into the separating chamber. Where the dispensing apparatus is indoors, a long vent pipe extending to the roof is usually required by law, and of course such should be protected against rain and dirt entering by a bend or hood 27a. The holes 26 in the vent valve and the cooperating openings in the vent valve guide are sufficiently small to cause liquid on reaching these holes to be slowed up and put under enough increased pressure to slide the vent valve closed.

Figure 7:
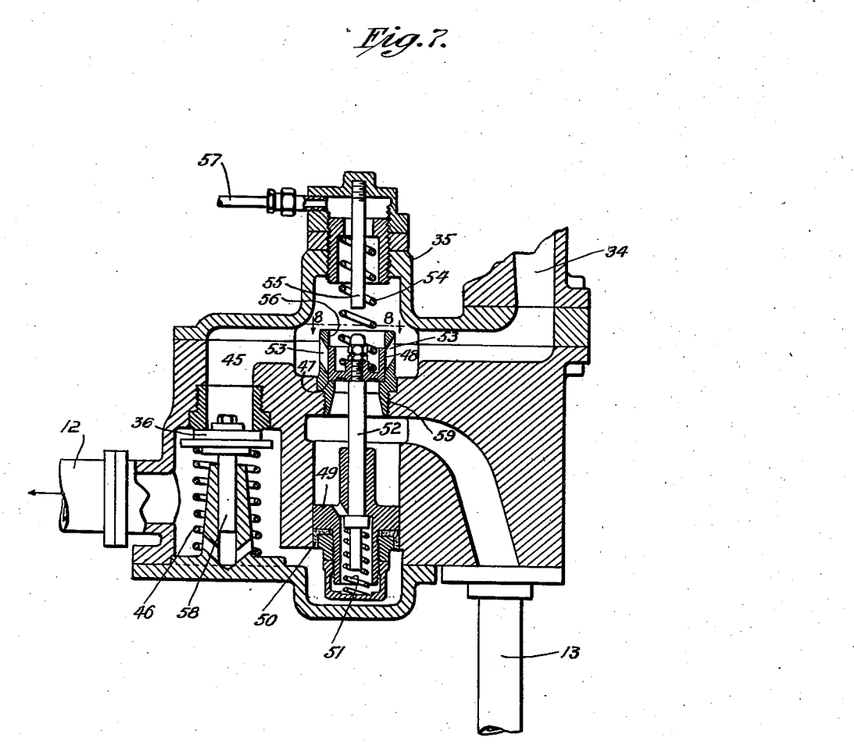
Fig. 7 is a cross-sectional view showing one type of balanced relief valve.

Another flap valve 28 is pivoted on the shaft 29, to which is secured a lever arm 30, connected with the actuating rod, 31, through the yieldable spring 31a, said rod 31 being connected also to the lever arm 22, as shown in Fig. 2. A vent opening 32 is likewise provided in the valve 28. When the valve 28 is open it is in the dotted line position indicated in Fig. 1 and thereby enables liquid to flow through the passage 34 and thence either out the discharge pipe 12 or through the return pipe 13 past the relief or check valve. A vent opening 33 extends from near the outlet portion of the separator housing to the upper portion thereof, so that particles of gas or air not completely separated previously, may have a chance to separate out into the upper portion of the chamber. Fig. 7 shows a balanced relief valve controlling the liquid supply to the return pipe 13. Liquid entering by the passage 34 will, when the discharge nozzle is open, flow past the relief valve within housing 35, and the normally open check valve 36, (Fig. 7) passing out the discharge pipe 12.

In Figs. 4 and 5, pivoted on the arm 24, at 37, is a lever 38, whose upper portion is hook-shaped, as illustrated. A spring 39 wound around the shaft 23 engages the upper portion of the lever 38 and normally biases it into engagement with the lower flange on the vent valve 25, while the valve is raised or closed. On lowering the arm 24, the hook lever 38 positively depresses and opens the vent valve 25 against any pressure within the separator chamber. On further lowering the arm 24, the lever 38 has its lower portion brought into engagement with a roller 40 mounted on a fixed shaft 41 so that the lever 38 is caused to swing in a slightly counter-clockwise direction to disengage the hook from the valve 25, thereby leaving the valve 25 free to be closed by a liquid surge or splash within the separator chamber. The housing 42, shown in Fig. 3 encloses the linkage connecting the flap valves with the vent valve actuating mechanism. At the left and lower side of the separating chamber is located a return valve 43, closing the passage leading to the suction side of the pump. A spring 44, substantially balances the weight of the valve 43, holding it normally open, but yet sensitive enough so that suction closes the valve.

In operation on starting the pump 11, the return valve 43 is closed by suction and held closed while the pump is in operation. Should a foot valve leak, the suction lift in pipe 10 may volatilize some of the liquid and require removal of gas as well as air for meter accuracy. After starting the pump liquid is discharged through the opening 15, but before doing so any air has a chance to be vented through the opening 17 and out the vent 27 in the top of the chamber. This vent 27 is open while the pump is not in operation. As the liquid rises through the opening 15, the flap valve 16 is moved to the dotted line position indicated. Such movement of the valve 16 swings the lever arm 21 in a clockwise direction moving the rod 20 to the right as shown in Fig. 2 and swinging the lever 22 in a counter-clockwise direction, raising the arm 24 and raising and closing the vent valve 25 so that no more air or gas may escape out the vent passage 27. Any gas in the upper portion of the separating chamber will be compressed and cushion the rising liquid. While the pump is operating, the liquid must find an outlet so that valve 28 is raised to the dotted line position by its connected linkage to valve 16 and is kept raised by liquid flow through the passage 34, and the discharge pipe 12. There will be nothing to hold the valve 16 open after liquid flow past it ceases, so that it drops and closes, by gravity, swinging the lever 21 and the rod 20 to the left in Fig. 2. However, due to the elongated opening 20b, the lever 22 is not moved by this last movement of the rod 20, especially since opening of the valve 28 has moved the rod 31 to the right tending to hold the lever 22 in position with the vent valve 25 closed. On closing the valve at the discharge nozzle the pressure in the discharge pipe 12 immediately rises, closing the valve 36 and opening the balanced relief valve 48 of Fig. 7 or opening the relief valve 76 of Fig. 9, so that liquid may be recycled through the pipe 13 or 13a. When the discharge nozzle is partially closed, pressure in the system rises and partially opens the relief valve so that part of the liquid being pumped may pass through the discharge pipe 12 to the nozzle and part through the return pipe 13. As soon as the pump stops, liquid flow ceases and the flap valve 28 closes by gravity. This closing movement of the valve 28 shifts the rod 31 to the left in Fig. 2, moves the lever 22 in a clockwise direction, lowers the arm 24, and causing the hook lever 38 to pull the vent valve 25, downwardly opening it. The vent valve is preferably constructed so that it can not move lower than its open position shown in Fig. 4. Continued movement of the arm 24 disengages the hook 38 in the valve 25, in the manner described above. Stoppage of the pump enables the spring 44 to raise the valve 43 from its seat and this opening permits any liquid in the separating chamber to be drained past the valve 43 into the suction side of the pump. As soon as the vent valve 25 has been opened, the separating chamber will have atmospheric pressure on the inside. This atmospheric pressure will eventually reach the underside of valve 43, and thus the vent valve 25, and the valve 43 may together act as a siphon breaker to prevent any leaky foot valve which might exist, being a cause of liquid being sucked out from the pump. As soon as the air pressure is admitted past the valve 43, any siphoning action is broken thereby leaving a residual pool of liquid on the intake side of the pump to assist in priming the same on starting again.

Figure 8:
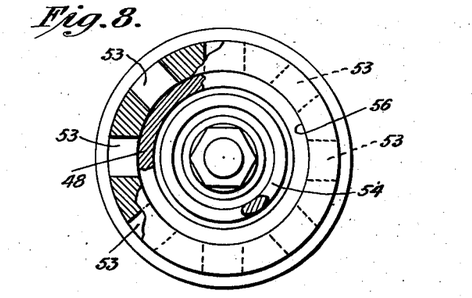
Fig. 8 is a view greatly enlarged on the line 8—8 of Fig. 7.
Figure 9:
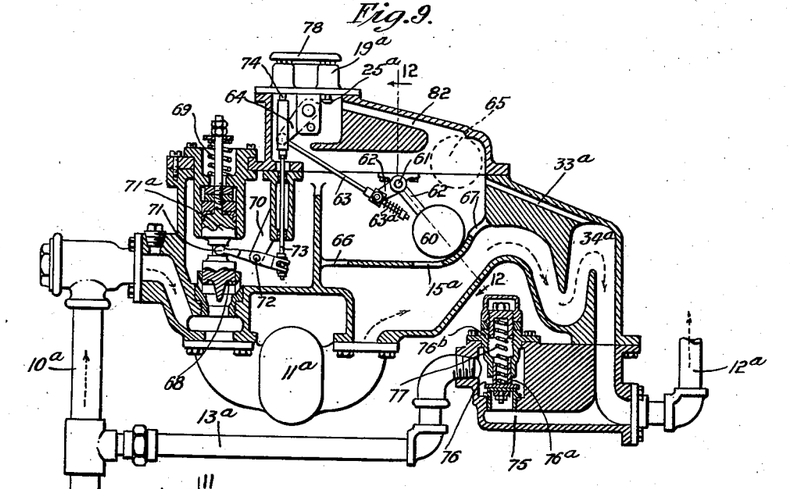
Fig. 9 shows another embodiment of this invention.

The relief valve shown in Fig. 9 is the same as that shown in Fig. 1. In Fig. 7 the relief valve is substantially balanced. Liquid pumped from the gas separating chamber enters by the passages 34 and 45, and flows past the valve 36, out the discharge line 12. The spring 46 is preferably only strong enough to nearly support the weight of the valve, the valve being normally held open and away from its seat. With normal nozzle discharge the spring 54 is sufficient to keep valve 48 on its seat. On reduction of liquid movement through the discharge nozzle, the increase in pressure is sufficient to raise the piston 49 against the action of the spring 51, and raise the valve stem 52, slightly opening the valve 48 on its upward movement away from its seat 47. Some appropriate form of packing 50, such as leather or the like, assists in maintaining good contact around the piston 49 without having too tight a fit. The piston 49 is made relatively movable with respect to the valve stem 52 in order that the spring 51 may exert a yieldability or cushion action upon the liquid somewhat akin to the effect of an air cushion of limited size. One advantage of the balanced valve shown in Fig. 7 is its ability to be partially open, without chatter, when the discharge nozzle is only partly open. As soon as the valve 48 is raised slightly from its seat the fit of the piston 48 within its cylindrical guide 56 allows a small amount of liquid to leak past the piston. On further raising piston valve 48, the ports 53 will be slightly uncovered. A number of these ports are provided as shown in Fig. 8, and while they are cut by a circular drill, due to the inclination illustrated, the trace of these ports on the cylindrical guide surface 56 is elongated or of generally elliptical shape. The greater the upward movement of the piston away from its seat, the greater is the amount of port opening and the greater may be the liquid flow through the ports 53 to the under side of the piston valve 48, and out the passage leading to the return pipe 13. The spring 54, balances part of the upward thrust on the stem 52, due to the piston 49, this spring co-operating with the piston valve 48, and with the housing 35, the additional downward pressure is exerted by liquid pressure on the upper surface of piston valve 48. A fixed stem 55 is provided to limit upward movement of the piston and prevent the piston being moved out of its guide 56. In event any gases should enter or form in the chamber 35, especially with the unit at rest, a vent pipe 57 leads off to the top portion of the gas separating chamber although the connection for this pipe has not been shown in Fig. 1. The stem 58 on the valve 36 provides a suitable guide by its co-operation with the inside of the cylinder illustrated in which it slides. The cylindrical guide, 56, for the piston valve 48, is made removable, being attached to the housing or casting by screw threads 59. When the nozzle or discharge pipe is fully closed, pressure rises still more, raising piston 48 enough to relieve the pressure and allow liquid to flow out the return pipe. The rise in pressure has slammed valve 36 closed and this valve is held closed by the pressure prevailing on the underside of the piston 49. The cushioning action due to spring 51 augments and maintains the pressure in the discharge line whereby the valve 36 is held closed and thus prevented from chattering. The valve 48 remains open and liquid is by-passed without pressure loss other than pipe friction. Piston valve 48 may remain partially open in event the discharge nozzle is partially closed. The piston 49 is made larger than valve 48. The hole shown in piston 49 provides a quick inlet and outlet for liquid through the piston as spring 51 is extended and compressed.

Figures 10, 11, 12:
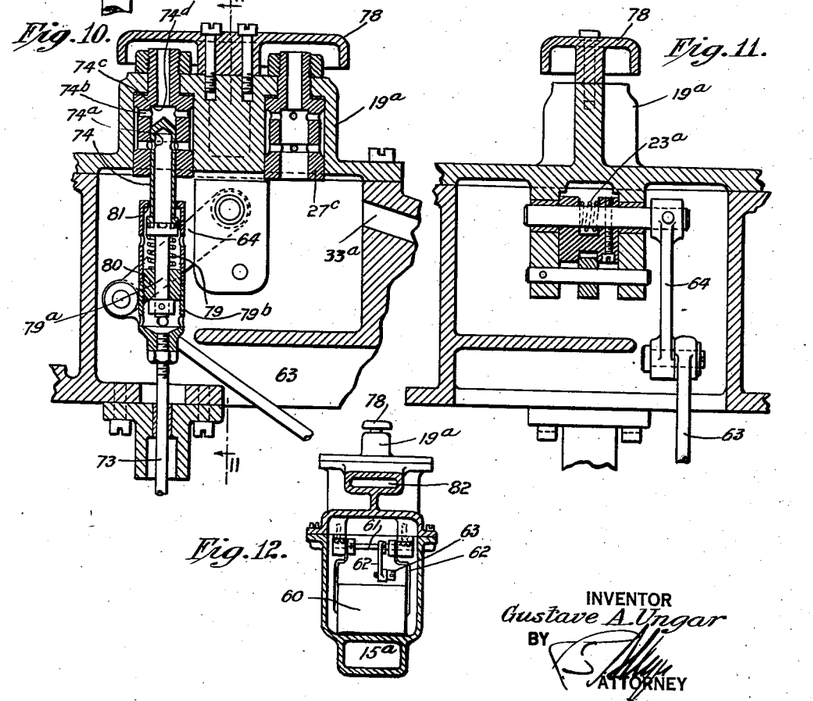
Fig. 10 is a cross-sectional detail of some of the vent valve structure in Fig. 9.
Fig. 11 is a view on the line 11—11 of Fig. 10.
Fig. 12 is a section on the line 12—12 of Fig. 9.

In Fig. 9 is shown another type of air or gas separator. Liquid is sucked through the pipe 10a from the supply tank by the pump 11a and discharged through the opening 15a into the portion of the chamber around the float 60. This float is mounted on a bell crank lever 62 pivoted to the shaft 61 and connected to the rod 63, a spring 63a, providing a yieldable connection, or if desired the connection may be substantially non-yieldable or with lost motion. The rod 63 connects with the lever 64, and this lever actuates a vent valve 25a in its guide 27c, in a manner analogous to the operation of the vent valve, by the lever 22, in Figs. 1 to 5, inclusive. The actuating arm and hook for closing and opening the valve 25a has not been shown in Figs. 9 and 10, for example, since they were shown in earlier figures. As the float 60 rises, the vent valve 25a is closed in response to the float movement; the dotted position 65 illustrates the upper position for the float. In addition to the opening 15a, other openings 66 and 67 are provided, all leading into the upper portion of the separating chamber.

Unlike the embodiment illustrated in Fig. 1, the construction of Fig. 9 contemplates the provision of a second vent opening and vent valve for the purpose of more quickly opening the upper portion of the separating chamber to the atmosphere, on stoppage of the pump, since the float may descend somewhat gradually and not open its vent valve 25a as soon as is desired. The float would stay in its raised position after the pump stopped if the foot valve in the pipe 10a were tight, the liquid descending gradually only if the foot valve leaked. A suction operated valve 68 is closed during operation of the pump and on stoppage of the pump its spring 69 raises the valve 68 to allow any liquid surrounding the valve to pass back to the suction side of the pump where it is available for priming the pump the next time it sarts. Unlike the liquid return valve of Fig. 1, the valve 68 in Fig. 9 is substantially balanced through piston 71a of substantially the same diameter as valve 68, against pressure in the separating chamber. This makes the valve 68 easy to open under any substantial pressure in the separating chamber. Spring 69 does not have to raise this valve against pressure to the same extent that does spring 44 in Fig. 1. Movement of the valve 68 controls the second vent valve 74 through the lever 71 pivoted at 72 to the stationary arm 70 and connected to the rod 73 which actuates the valve 74, the connection between the valve 74 and the rod 73 being shown more clearly in Fig. 10.

Each of the vent valves is individually and separately responsive to any liquid surge or splashing so that either or both may be closed by such contact with liquid and held closed by pressure within the separating chamber. Each of the vent valves is positively opened, valve 25a by the mechanism described in connection with Figs. 4 and 5, and valve 74 by the mechanism shown in Fig. 10. As was the case in Fig. 1, a suitable hood 78 may be provided over the vent openings to prevent admission of rain or dirt into the separating chamber when the pump is stopped. The tube 79b illustrated on the upper end of the rod 73 is internally threaded and provided with a nut 80. The spring 79 normally pushes the upper end of the rod 79a upwardly into contact with the valve so that movement of the valve in closing is made yieldable by the spring 79. A liquid surge will lift valve 74 and close the holes 74a in the valve by moving them out of registry with the holes 74b in the valve guide 74c. The tapered end of valve 74 is brought into contact with its seat 74d only when rod 73 is lifted, the motion being transmitted to the valve through tube 79b, nut 80 and rod 79a and spring 79. The internal flanges 81 engage the lower part of the valve for positively lowering the valve against any pressure within the separating chamber. Liquid is discharged from the separating chamber through the passage 34a and out the discharge pipe 12a. The space 75 connects with the path of liquid movement and on throttling or stoppage of liquid flow through the discharge nozzle the relief valve 76 is raised from its seat against the action of the spring 77, allowing liquid to pass through the return line 13a. The cylindrical guide 76a for valve 76 slides in its housing 76b and exerts a cushioning action on valve 76, tending to reduce chatter of this valve. The passage 33a leads into the portion of the separating chamber adjacent the float and the passage 82 leads still further upward to the space around the vent valves.

Figure 13:
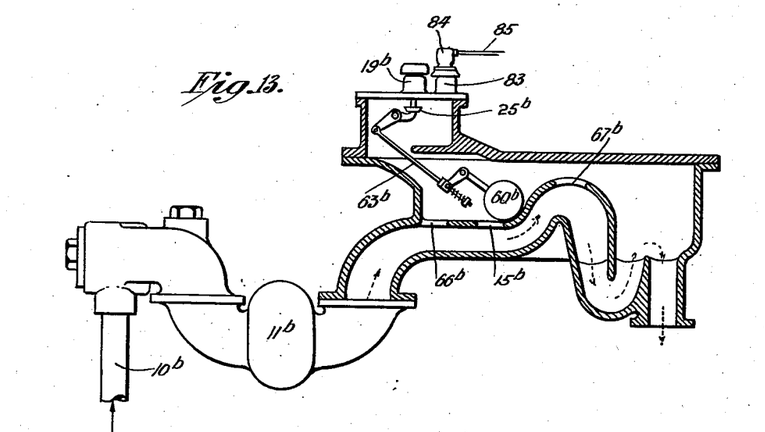
Fig. 13 illustrates another embodiment of this invention.
Figures 14, 15:
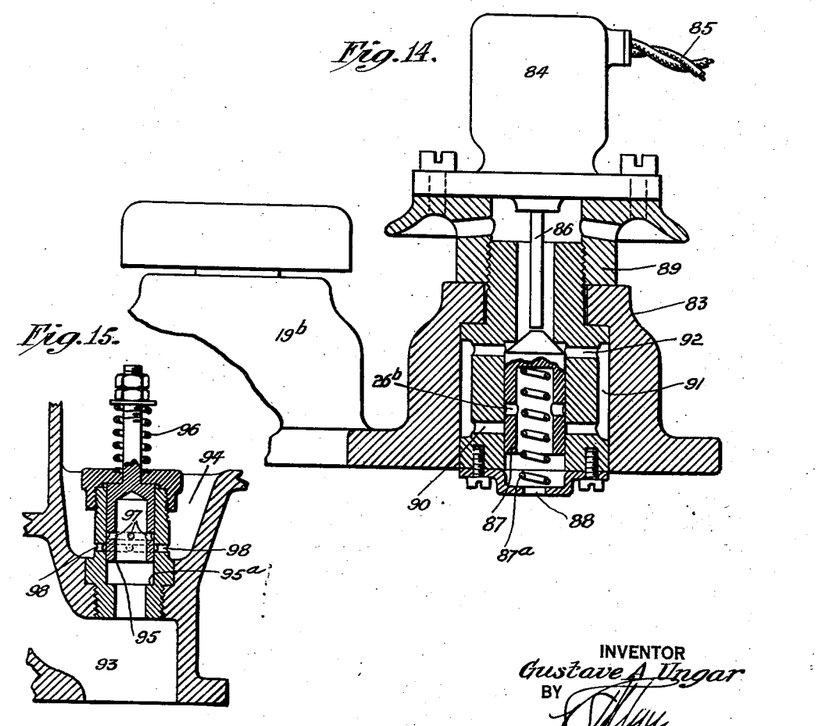
Fig. 14 is an enlarged cross-section of the solenoid operated vent valve of Fig. 13.
Fig. 15 illustrates one type of liquid return valve for location between the gas separator and the suction side of the pump.

In Fig. 13 is illustrated one of the simpler embodiments of this invention adapted especially for low suction heads. Liquid is sucked through the pipe 10b by the pump 11b, thence through the openings 15b, 66b, 67b, into the upper portion of the separating chamber where a float 60b is located. This float by means of the linkage 63b controls the vent valve 25b, in the same manner described in connection with the vent valve, in the first sheet of drawings herein. In addition a second vent valve is provided on top of the separating chamber controlled by a solenoid as shown in Fig. 14, but it should be understood this second vent valve may or may not be used. Its use insures quicker venting to the atmosphere on stoppage of the pump.

The solenoid 84 is supplied by wires 85 which may be directly in series with the motor operating the pump, or may be controlled in response to motor operation through some well known type relay mechanism. Starting the motor driven pump causes current to pass through the solenoid 84, raising its armature 86, freeing valve 87 and enabling it to be closed by a liquid surge or by pressure of the spring 87a, or by fluid pressure within the separating chamber after the holes 26b in the valve have been raised out of alinement with the holes 90 in the valve guide or housing. When the pump has stopped and current is off the motor, a spring (not shown, but within the solenoid housing and stronger than spring 87a) pushes armature 86 downwardly far enough to bring lower valve 87 and bring holes 26b into registry with holes 90. Gas pressure within the separator is then vented through the openings 90, 91 and 92, for passing out the vent opening. It should be noted that the valve 87, like the other vent valves heretofore described, is made so as to be closed by any liquid surge which might enter through the opening 88 at the bottom of the valve. The nut 89 on top of the vent valve housing is provided with openings as illustrated and the petticoat or shielding portion prevents the admission of rain or dirt into the separating chamber.

In Fig. 15 is illustrated a modified type of liquid return valve 95 which is adapted for use in place of the valves 43 of Fig. 1 or 68 of Fig. 9, except that this type valve is not as well adapted for actuating a second vent valve as is the type valve shown in Fig. 9. The suction passage 93 for liquid into the pump is provided with this liquid return valve, so that some of the liquid in the space 94 from the separating chamber may be drained back for priming the pump. In starting the pump the valve 95 is moved downward by suction, the suction acting against the spring 96 and causing the openings 97 and 98 to be brought into alignment as the valve moves downward. Continued downward movement under suction moves the valve 95 until it engages the ledge 95a at which time the holes 97 in the valve 95 are below the holes 98 in the valve guide. The valve is held by suction in this lowermost position contiguous ledge 95a during the remainder of the pump operation. On stopping the pump, valve 95 is raised by the spring 96 to the position illustrated. As the valve moves upward the holes 97 and 98 are brought into alignment and liquid allowed to drain through to the suction side of the pump. Pressure in the separating chamber aids in lowering and holding the valve down. Reduction of this pressure on stoppage of the pump aids in raising the valve. The size of the openings 97 and 98 may control the rate at which liquid may flow through the valve and therefore this valve may be constructed as a suitable delay action type liquid return valve, capable of being open during only some of the operation of the pump.

Figure 16:
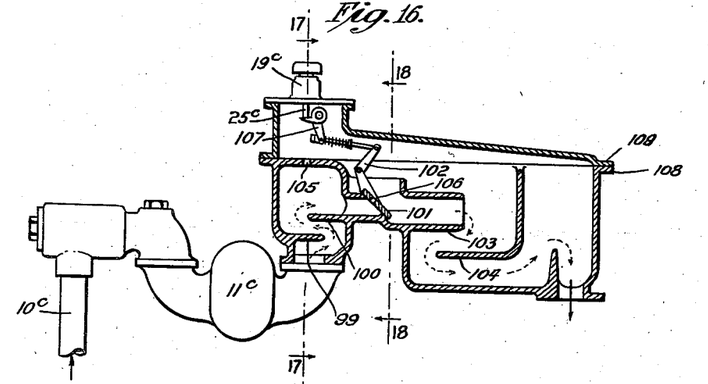
Fig. 16 shows still another embodiment of the invention.

Fig. 16 shows another embodiment of this invention which, like the device of Fig. 13, is provided with no liquid return connection nor vacuum breaker on the suction side of the pump. The baffles 99 and 100 provide a tortuous path for liquid movement as it flows toward the flap volve 101, and after opening this valve out of the separating chamber in the direction of the dotted lines shown in the drawings. The baffles 103 and 104 also assist in providing the desired tortuous path which is effected in assisting in eliminating particles of gas contained within the liquid. The vents 105 and 106 enable gas to be discharged into the upper portion of the separating chamber regardless of whether or not the flap valve 101 is open. This valve opens by liquid flow or surge and through the linkage 102 actuates the vent valve 25c. This valve operates in the manner described in connection with valve 25a in Fig. 1. No additional vent valve is shown in the embodiment of Fig. 16, though it will be understood a second vent valve may be provided and such suction valve operated by either a solenoid or any other mechanism which enables the operation of the vent valve to be substantially responsive to operation of either the motor or pump. The lever 107 for operating the vent valve 25c may be yieldably operated on opening movement of the flap valve to close the vent, but as illustrated is not yieldably actuated on opening the vent valve. Lever 107 may also be operated by a lost motion linkage with the flap valve. While the additional hooked lever for opening the vent valve has not been shown, it will be understood that such may be used. The flap valve 101 is kept open by liquid flow during operation of the pump, but as soon as the pump stops the valve 101 closes by gravity.

Figures 17, 18, 19:
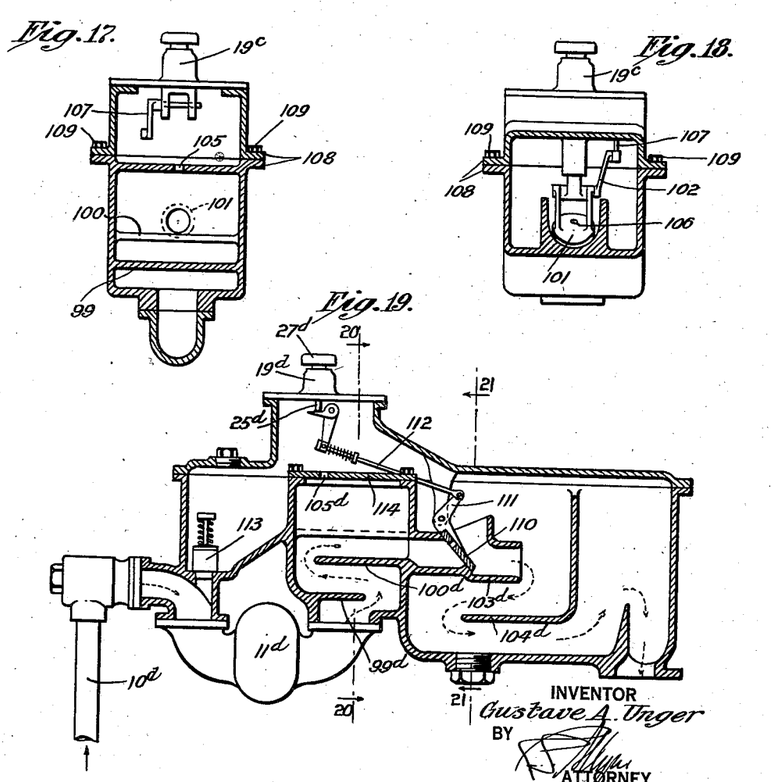
Fig. 17 is a section on the line 17—17 of Fig. 16.
Fig. 18 is a section on the line 18—18 of Fig. 16.
Fig. 19 shows yet a further embodiment of this invention.
Figure 20:
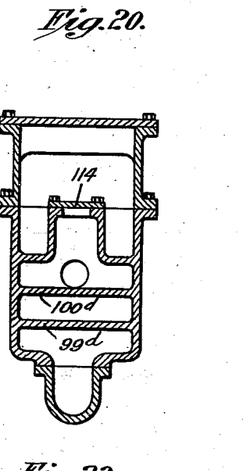
Fig. 20 is a section on the line 20—20 of Fig. 19.
Figure 21:
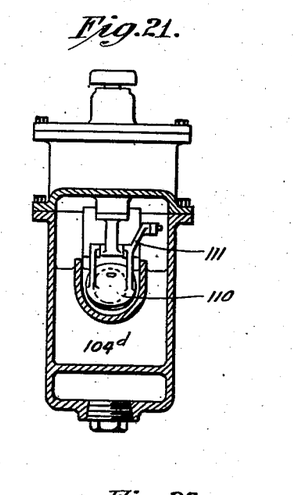
Fig. 21 is a section on the line 21—21 of Fig. 19.

As shown in Figs. 17 and 18, the separating chamber may be made of castings in two parts, the flanges 108 being finished so that these two portions may be held together by bolts 109 or in any other convenient manner.

Fig. 19 shows still another embodiment of this invention, the same being provided with a number of baffles 99b, 100b, 103b, and 104b, as well as the vent opening 105d in the removable cover plate 114. The flap valve 110 actuates in the same manner described in connection with Fig. 16, that is by the bell crank lever 111 actuating the rod 112 for closing the vent valve 25b. Unlike Fig. 16, the device of Fig. 19 is provided with a suction operated valve 113 to permit liquid return from the separating chamber to the suction side of the pump for priming same. This valve 113 may be of the general type described and illustrated in Fig. 1. Or if desired, the valve 113 may be solenoid operated according to the embodiment hereinafter described in connection with Fig. 23.

Figure 22:
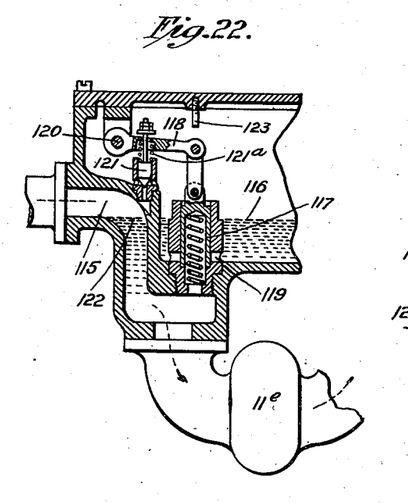
Fig. 22 shows a suction operated siphon breaker and return valve.

In Fig. 22 is shown a suction operated liquid return valve which controls a siphon breaker. The liquid supply to the pump, 11e, is through the passage 115. As the pump starts the valve 117 is moved downward by suction closing the openings 119 and preventing any liquid flowing to the suction side of the pump from above the level 116 in the separating chamber. As the valve 117 is pulled downward the linkage 118 causes the valve 121 to likewise move downward through the interposed spring 121a closing its small opening and thus shutting off egress of atmospheric pressure from the separating chamber to the intake side of the pump. On stoppage of the pump the spring shown inside the valve 117 raises the valve and likewise raises the lever arm 118, pivoted at 120, which causes the siphon-breaking valve 121 to be raised permitting air pressure to have access to the liquid supply line. Locating the siphon breaker at a position illustrated and having the pump located as shown, permits the provision of a substantial liquid pool on the supply side of the pump. As soon as the siphon breaker is open, and the pump stopped, liquid will be maintained at level 122. The abutment 123 prevents the spring raising the valve 117 to a greater amount than is desired. It will be understood the siphon breaker 121 may be made responsive to any other heretofore described type of liquid return valve. It should also be remembered that a liquid return valve is not even necessary in Fig. 22 since the siphon breaker may be made responsive to a suction device 117 without having this suction device function as a valve.

Figure 23:
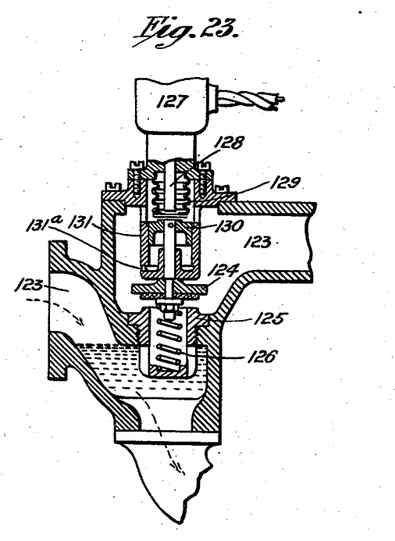
Fig. 23 shows the solenoid operated type of return valve.

In Fig. 23 is shown a liquid return valve actuated by a solenoid 127. The liquid supply passage 123 leads to the pump and the valve 124 is kept off its seat by the spring 126. The armature of the solenoid 127 is pulled downward on the flow of curernt through the solenoid in response to operation of the motor, the solenoid being in series or otherwise suitably connected with the motor. Downward movement of the solenoid armature pushes down the rod 128 within the expansible cylinder 129 to press down the piston 130. The use of the expansible cylinder or metallic bellows 129 does away with the necessity of having to have packing around the stem 128. The guide 131 for the piston 130 directs the downward movement of the valve 124 onto its seat, and by providing a small escape opening 131a for displaced liquid or gas, the closing of valve 124 may be suitably delayed. This construction as well as each of the heretofore described liquid return valves, is generally responsive to actuation of the motor and pump. The inside of the separating chamber having been vented promptly, enables the valve of Fig. 23 to function as a siphon breaker, maintaining the liquid level at the height illustrated on stopping the pump.

Figure 24:
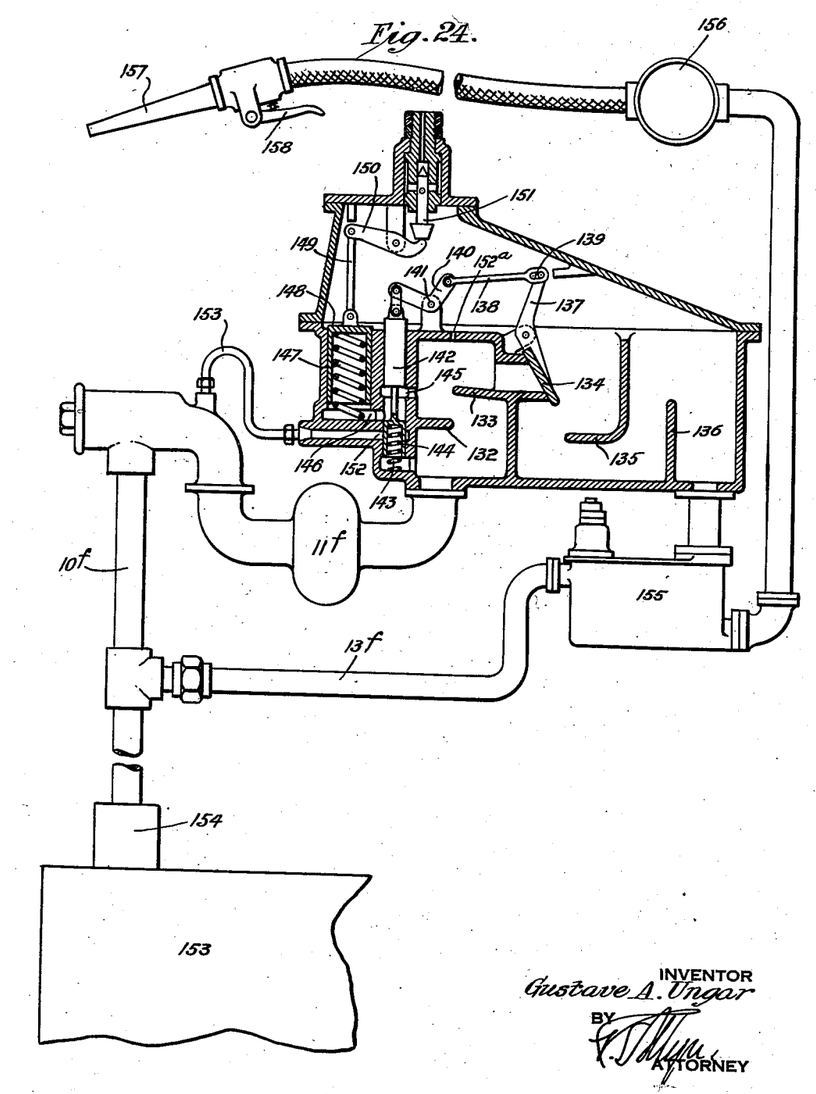
Fig. 24 shows still another embodiment of this invention adapted for use with greater pressures.

In Fig. 24 is illustrated a construction suitable for higher liquid pressures than have been contemplated in the preceding figures, yet enabling the vent valve on the separating chamber to be opened by a flap valve or float without difficulty against the higher pressure within the separating chamber. This is accomplished by means of a servo-mechanism for actuating the vent valve. Liquid is supplied through the pipe 10f to the pump 11f, and thence into the lower portion of the separating chamber whence it passes around the baffles 132 and 133 to the flap valve 134 and thence around the baffles 135 and 136 and out the discharge pipe to a suitable relief valve, not shown. Some gas may pass through opening 152a. The flap valve 134 actuates the lever 137, which is connected with the rod 138 through the lost motion connection 139, rod 138 being in turn connected to the bell crank lever 140, pivoted at 141 and connected to the piston valve 142, which is balanced by the piston valve 144 on the same rod. The opening 145 provides access to the space between the pistons 142 and 144, and this space is connected with the space 146 beneath the piston 148.

A spring 143 is provided to counterbalance the weight of valve 142—144 and the links connecting it to bell crank 140. The weight of the flap valve 134 keeps it closed when there is no liquid flowing. This flap valve may or may not have a vent hole in it. When the flap valve 134 opens, lever 137 first takes up the slack in the lost motion connection 139 and upon further opening of flap valve 134 the balanced piston valve 142—144 is moved downward closing the port 145 and opening the port 152, to the space 146 beneath the piston 148. As illustrated, the port 152 is connected by the pipe 153 so as to be subject to the suction created by the pump 11f. The spring 147 raises the piston 148 and transmits motion through the connecting rod 149 to the lever 150, which in turn actuates the vent valve 151. In the position illustrated with the flap valve closed the pressure of the atmosphere or greater pressure is admitted to both sides of piston 148, enabling the spring 147 to raise the piston 148, allowing the vent valve to be open. As soon as the flap valve 134 opens, the balanced piston 142—144 is moved to a lower position connecting the space 146 beneath the piston 148 to the suction pressure of the pump and the port 152, thus enabling pressure on top of the piston 148 and suction beneath it to depress the piston against the action of the spring 147 and causing the vent valve 151 to be closed and held closed while the flap valve is open. While not shown in detail, it should be understood the vent valve 151 may be made responsive to any liquid surge for closing. Also the vent valve 151 should be provided with the hooked lever mechanism of Figs. 4 and 5 for positively opening it on closing the flap valve 134. Instead of depending on pressure and suction of the pump 11f to actuate the servo mechanism controlling the vent valve, it will be understood that a separate and independent source of pressure such as an auxiliary pump may be used for operating this mechanism. The balanced piston valve 142—144 may also be operated by a float so that the piston 148 will open the vent with low liquid level and close it with high liquid level.

The supply tank 153 usually located underground has a foot valve 154 located near it in the supply pipe to the pump. After passing through the gas separator chamber, liquid is pumped past a relief valve of the type illustrated in Figs. 7 or 9 and thence through meter 156 to nozzle 157 controlled by trigger control 158 as is customary. The supply tank, foot valve, relief valve, meter and nozzle with its control is contemplated for use with any of the foregoing embodiments of this invention as well as with the device of Fig. 25.

Figure 25:
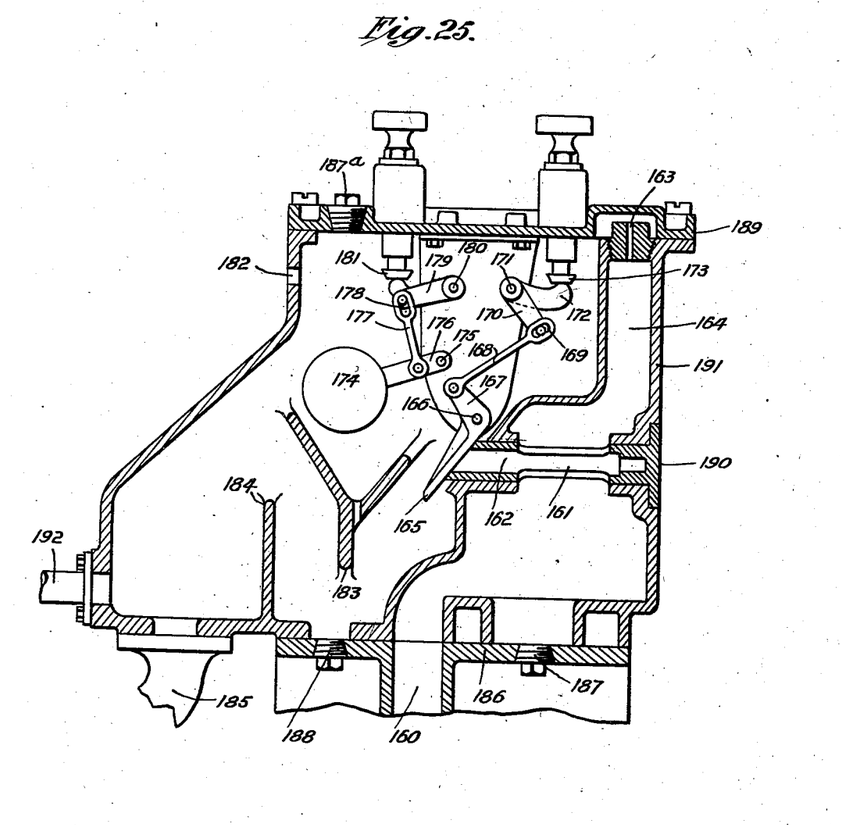
Fig. 25 illustrates a preferred embodiment of this invention.

In the preferred embodiment of Fig. 25 is shown a separating chamber having two vent valves, one controlled by a flow responsive flap valve and the other by a float, each vent valve being adapted to close in response to a liquid surge and each also being opened positively by a hooked lever of the type shown and described in Figs. 4 and 5 for example. Liquid from the pump enters the passage 160, thence through the aligned openings 161 in the removable tube 162 into chamber 164 having on top thereof a vent 163. The flap valve 165, pivoted at 166 is provided with a lever 167 engaging the connecting rod 168 which has a lost motion connection 169 with the lever 170 pivoted at 171. On raising the flap valve 165 by liquid flow the level 172 is raised to close the vent valve 173, the tight closing being assisted when pressure is built up within the separating chamber. As liquid fills the separating chamber the float 174 is raised about its pivot 175, swinging lever 176 to which is connected the rod 177 having a lost motion connection 178 with the lever 179 pivoted at 180. As the float is raised to the dotted line position, the vent valve 181 is closed and liquid without air or gas content is now discharged through passage 185. Upon stoppage of the pump the flap valve falls by gravity to its seat opening the vent valve 173, usually in advance of opening of the vent valve 181 since the float normally falls slowly due to any leakage through a foot valve. On accumulation of gas volume during the pumping operation in the upper portion of the separating chamber, the liquid flow may not be reduced sufficiently to allow flap valve 165 to be closed sufficiently to cause the hooked lever to positively open the vent valve 173 and relieve gas pressure within the upper portion of the separating chamber. The drop in liquid level is sufficient, however, to drop float 174 and to open vent valve 181 through the action of a hooked lever of the type shown in Figs. 4 and 5. Air and gas is freely discharged through vent valve 181, but any liquid surging up promptly closes the vent valve, as described for Figs. 4 and 5. The rising liquid level raises float 174 and again closes vent valve 181, thereby again diverting the full liquid stream into passage 185 and into the meter and nozzle. The flap 165 remains lifted up, thus also keeping vent valve 173 closed. The path of the liquid from the passage 162 is beneath the rib or baffle 183 and over the top of the rib 184. These ribs make it possible for gas to be automatically vented from the separating chamber upon accumulation of a predetermined amount, without the danger of any gas passing out of the separating chamber with the pumped liquid which flows out through the opening 185. The separating chamber is shown as being mounted on a flange 186 constituting a part of the pump housing. In case access should be desired to the interior of the separating chamber drain plugs 187 and 188 are provided for that purpose. Also filling plug 187a is provided on top of the separating chamber, in the removable roof or top plate 189. In event a gas vent pipe 57 leads from the relief valve as shown in Fig. 7, the same would in this construction be connected to the separating chamber at the opening 182. The liquid passage 162 is formed integrally with a removable plug portion 190 which is adapted for reception within a countersunk portion of the gas separator chamber side wall 191. Where a liquid return valve is used to return any excess liquid to the suction side of the pump as described for example in Fig. 1 and other constructions, such valve is in this embodiment contained in a separate housing which is connected by a pipe with the lower portion of the separating chamber as shown at 192.

Among the advantages of this invention may be mentioned greater economy and safety of operation. Greater safety is obtained because of the precautions taken to prevent liquid being forced out any of the vent openings. The vent valves of this invention are preferably each responsive to a liquid surge so that in event of liquid rising into contact with the valve it closes to prevent liquid passing out the vent. The tortuous path provided for any liquid and gas mixture before reaching the vent opening is another feature to prevent the passage of liquid through the vent opening. The vent valves are closed either in response to operation of the pump and motor or in response to a float or to a flap valve, which latter in turn is responsive to flow of the liquid. The prevention of liquid passing through the vent does away with the necessity for any recovery or settling chamber to catch liquid so discharged. It thereby eliminates unnecessary pumping losses, because no liquid passes the vent and therefore no excess liquid has to be pumped to make up for the liquid lost through the vent. Elimination of such a recovery chamber makes for greater compactness and simplicity. Another desirable feature of this invention is the provision of an ample liquid supply for automatic self priming of the pump. Still a further feature is the provision of a number of vent openings all leading to the valve controlled vent opening in the top of the separating chamber.

The various illustrated embodiments of this invention having only a flap valve vent control are each capable of opening a vent during pumping when the volume of gas reaches an amount sufficient to allow partial closure of the flap valve. No gas can therefore be pumped to the meter.

Instead of a vent valve responsive to either a float or a flap valve, it will be understood that only one vent valve may be provided and this made generally responsive to motor or pump operation in the described manner by a solenoid or by any other mechanism such as a centrifugal governor, etc., if the separator chamber is made large enough to hold all separated gas that might be formed during a run.

I claim:

1. In a liquid dispensing apparatus, a gas separator, a vent on the separator, a valve closing said vent, means for closing said valve in response to a liquid surge at said valve, said valve being adapted to be held closed by pressure within said separator greater than air pressure, and means responsive to the stoppage of liquid flow through said separator for opening said valve against said pressure.

2. A liquid dispensing apparatus comprising a pump, a gas separator connected to said pump, a vent valve on said separator, means for closing said valve before any substantial amount of liquid has had a chance to pass said valve, said valve being constructed to be held closed by pressure within said separator, and means including a flow responsive element disposed in the path of liquid flow adapted on substantial reduction or stoppage of flow of liquid but not of gas to positively open said valve against the pressure within said separator, and adapted on full flow of liquid to close said valve.

3. A liquid dispensing apparatus comprising a gas separator, a vent valve on the separator, means for closing said vent valve before any substantial liquid has had a chance to pass said vent valve, and a liquid flow-controlled lever mechanism which operates independently of liquid level for positively engaging said valve and automatically opening the vent against any pressure in said separator.

4. A dispensing apparatus including a pump, a separating chamber in which gaseous portions may be eliminated from the liquid after passing said pump, a vent and a valve closing said vent, fluid pressure means for actuating said valve, a flow responsive valve in said separating chamber, valve mechanism controlling said fluid pressure means, and means connecting said valve mechanism and flow responsive valve.

5. In a liquid dispensing apparatus the combination with a chamber in which gas may be separated from liquid moving therethrough, of a vent in the upper portion of said chamber, a valve controlling said vent and adapted to be held closed by pressure within said chamber, mechanism positively engaging said valve for opening the same against pressure within said chamber, and means for automatically freeing said mechanism from said valve after opening the same.

6. In a liquid dispensing apparatus, the combination with a chamber in which gas may be separated from liquid passing therethrough, a vent in the upper portion of said chamber, a valve for opening and closing said vent, said valve being constructed to be self closing in response to a liquid surge therein, and held closed by pressure within said chamber, mechanism for pulling said valve open against pressure in said chamber, and means for automatically releasing said valve from said mechanism to free the valve and render it available for again being closed by liquid surge.

7. In a liquid dispensing apparatus, the combination with a chamber in which gas may be separated from liquid passing therethrough, a vent in the upper portion of said chamber, a valve for opening and closing said vent, said valve being constructed to be self closing in response to a liquid surge therein, and held closed by pressure within said chamber, and means for opening said valve in response to a stoppage of liquid flow or in response to a substantial reduction in cross-sectional area of liquid flow through a portion of said chamber.

8. In a liquid dispensing apparatus, the combination with a chamber in which gas may be separated from liquid passing therethrough, a vent in the upper portion of said chamber, a valve for opening and closing said vent, said valve being constructed to be self closing in response to a liquid surge therein, and held closed by pressure within said chamber, and means for opening said valve in response to a predetermined volume of gas collecting in said chamber and means for again closing said valve in response to a substantial reduction in the volume of gas in said chamber while liquid is flowing therethrough.

9. In a liquid dispensing apparatus, a gas separator, a vent on the separator, a valve for closing said vent, means for closing said valve in response to a liquid surge at said valve, said valve being adapted to be held closed by pressure within said separator greater than air pressure, mechanism responsive to a stoppage or substantial reduction of liquid flow through said separator for opening said valve against said pressure, said mechanism positively engaging said valve for opening the same against pressure within said separator, and release means for automatically freeing said valve from said mechanism after opening of the valve.

10. A liquid dispensing apparatus comprising a gas separator, a vent valve on the separator, means for closing said vent valve before any substantial liquid has had a chance to pass said vent valve, a liquid flow-controlled lever mechanism which operates independently of liquid level for positively engaging said valve and automatically opening the vent against any pressure in said separator, said mechanism positively engaging said valve for opening the same against pressure within said separator, and release means for automatically freeing said valve from said mechanism after opening of the valve.

11. In a liquid dispensing apparatus, a gas separator, a vent on the separator, a valve for closing said vent, means for closing said valve in response to a liquid surge at said valve, said valve being adapted to be held closed by pressure within said separator greater than air pressure, means responsive to a stoppage or substantial reduction of liquid flow through said separator for opening said valve against said pressure, said flow responsive means comprising a flap disposed across the path of liquid flow and pivoted at its upper end, linkage operatively connecting said flap to mechanism for opening or closing the vent valve, the arrangement being such that the vent valve is closed by upward movement of the flap when full flow of liquid raises the flap, but is opened by downward movement of the flap upon reduction or stoppage of liquid flow, the mechanism for operating the vent valve including means for automatically releasing the valve from the valve-operating mechanism when the valve is opened, in order to free the valve and thereby render it available for again being closed by liquid surge.

12. In a liquid dispensing apparatus the combination with a chamber in which gas may be separated from liquid moving therethrough, of a vent in the upper portion of said chamber, a valve for opening and closing said vent, said valve being self-closing in response to a liquid surge, and adapted to be held closed by pressure within said chamber, mechanism positively engaging said valve for opening the same against pressure within said chamber, said mechanism comprising a latch and detent which engage to pull the valve open, and an additional abutment against which the latch is so moved as to disengage the latch from the detent when the valve is moved from closed to open position, thereby automatically freeing said mechanism from said valve, said latch and detent mechanism being so arranged as to automatically re-engage when the valve is again to be opened by said mechanism.

13. A dispensing apparatus including a pump, a separating chamber in which gaseous portions may be eliminated from the liquid after passing said pump, a vent, a vent valve for closing said vent, servo mechanism including a cylinder and a piston operated by fluid pressure for actuating said valve, a flow responsive device in said separating chamber, a pilot valve controlling the operation of said servo mechanism, and means connecting said flow responsive device to said pilot valve of the servo mechanism.

14. In a liquid dispensing apparatus, a gas separator, a vent on the separator, a vent valve for closing said vent, means for closing said vent valve in response to a liquid surge at said valve, said vent valve being adapted to be held closed by pressure within said separator greater than air pressure, and means responsive to a stoppage or substantial reduction of liquid flow through said separator for opening said vent valve against said pressure, said means including servo mechanism comprising a piston and cylinder, a pilot valve for controlling the flow of a pressure fluid to the cylinder, and linkage between the flow responsive means and the pilot valve so arranged as to close the vent valve upon full liquid flow, and to open the vent valve upon substantial reduction or stoppage of liquid flow.

15. In a liquid dispensing apparatus, a gas separator, a vent on the separator, a vent valve for closing said vent, means for closing said vent valve in response to a liquid surge at said vent valve, said vent valve being adapted to be held closed by pressure within said separator greater than air pressure, and flow responsive means responsive to a stoppage or substantial reduction of liquid flow through said separator for opening said vent valve against said pressure, said means including mechanism positively engaging said vent valve for opening the same against pressure within said separator, and release means for automatically freeing said vent valve from said mechanism after opening the same, said vent valve operating means further including servo mechanism comprising a piston and cylinder, a pilot valve for controlling the flow of a pressure fluid to the cylinder, and linkage between the flow responsive means and the pilot valve in order to open and close the vent valve.

16. In a liquid dispensing apparatus, a gas separator, a vent on the separator, a valve for closing said vent, means for closing said valve in response to a liquid surge at said valve, said valve being adapted to be held closed by pressure within said separator greater than air pressure, means responsive to a stoppage or substantial reduction of liquid flow through said separator for opening said valve against said pressure, said flow responsive means comprising a flap disposed across the path of liquid flow and pivoted at its upper end, linkage operatively connecting said flap to mechanism for opening or closing the vent valve, the mechanism for operating the vent valve including means for automatically releasing the valve from the valve-operating mechanism when the valve is opened, in order to free the valve and thereby render it available for again being closed by liquid surge, said vent valve operating mechanism further including servo mechanism comprising a piston and cylinder, and a pilot valve for controlling the admission of a pressure fluid to the cylinder, said pilot valve being moved by the aforesaid linkage and flap, and the arrangement being such that the vent valve is closed by upward movement of the flap when full flow of liquid raises the flap, but is opened by downward movement of the flap upon reduction or stoppage of liquid flow.

GUSTAVE A. UNGAR.